(12) United States Patent
Togai et al.

(10) Patent No.: US 9,393,592 B2
(45) Date of Patent: Jul. 19, 2016

(54) PROCESS FOR FORMING MULTIPLE LAYERED COATING FILM

(71) Applicants: NIPPON PAINT CO., LTD., Osaka (JP); HONDA MOTOR CO., LTD., Tokyo (JP)

(72) Inventors: Hirokazu Togai, Osaka (JP); Naotaka Kitamura, Osaka (JP); Keisuke Kojima, Saitama (JP); Takamasa Aoki, Saitama (JP); Takeshi Ogawa, Saitama (JP)

(73) Assignees: NIPPON PAINT CO., LTD, Osaka (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/385,276

(22) PCT Filed: Mar. 21, 2013

(86) PCT No.: PCT/JP2013/058097
§ 371 (c)(1),
(2) Date: Sep. 15, 2014

(87) PCT Pub. No.: WO2013/141305
PCT Pub. Date: Sep. 26, 2013

(65) Prior Publication Data
US 2015/0079293 A1 Mar. 19, 2015

(30) Foreign Application Priority Data
Mar. 22, 2012 (JP) .................. 2012-066012

(51) Int. Cl.
| | |
|---|---|
| *B05D 1/38* | (2006.01) |
| *C09D 175/04* | (2006.01) |
| *C08G 18/66* | (2006.01) |
| *C08G 18/75* | (2006.01) |
| *C08G 18/08* | (2006.01) |
| *C08G 18/12* | (2006.01) |
| *C08G 18/34* | (2006.01) |
| *C08G 18/44* | (2006.01) |
| *B05D 3/02* | (2006.01) |
| *B05D 7/00* | (2006.01) |
| *B05D 7/14* | (2006.01) |

(52) U.S. Cl.
CPC ............... *B05D 1/38* (2013.01); *B05D 3/0254* (2013.01); *B05D 7/574* (2013.01); *C08G 18/0823* (2013.01); *C08G 18/12* (2013.01); *C08G 18/348* (2013.01); *C08G 18/44* (2013.01); *C08G 18/6659* (2013.01); *C08G 18/755* (2013.01); *C09D 175/04* (2013.01); *B05D 7/14* (2013.01); *B05D 2202/00* (2013.01); *B05D 2420/02* (2013.01); *B05D 2420/03* (2013.01); *B05D 2420/04* (2013.01); *B05D 2501/00* (2013.01); *B05D 2503/00* (2013.01)

(58) Field of Classification Search
None
See application file for complete search history.

(56) References Cited

U.S. PATENT DOCUMENTS

| | | |
|---|---|---|
| 2005/0123684 A1 | 6/2005 | Makowski et al. |
| 2006/0188656 A1 | 8/2006 | Katsuta et al. |
| 2011/0135935 A1 | 6/2011 | Adachi et al. |
| 2011/0300389 A1* | 12/2011 | Kitagawa et al. .......... 428/423.1 |
| 2012/0021228 A1 | 1/2012 | Kitagawa et al. |
| 2012/0107619 A1 | 5/2012 | Kitagawa et al. |

FOREIGN PATENT DOCUMENTS

| | | |
|---|---|---|
| JP | 8-209059 | 8/1996 |
| JP | 2006-265535 | 10/2006 |
| JP | 2009-287039 | 12/2009 |
| JP | 2010-82554 | 4/2010 |
| JP | 2010/215885 | 9/2010 |
| JP | 2011-26421 | 2/2011 |
| JP | 2011-94102 | 5/2011 |
| JP | 2011-530393 | 12/2011 |
| WO | 2010/082607 | 7/2010 |
| WO | 2011/010538 | 1/2011 |
| WO | 2011/010539 | 1/2011 |
| WO | WO 2011010538 A1 * | 1/2011 |

OTHER PUBLICATIONS

International Preliminary Report on Patentability issued Sep. 23, 2014 in International (PCT) Application No. PCT/JP2013/058097.
International Search Report issued Jul. 2, 2013 in International (PCT) Application No. PCT/JP2013/058097.

* cited by examiner

*Primary Examiner* — Michael P Rodriguez
(74) *Attorney, Agent, or Firm* — Wenderoth, Lind & Ponack, L.L.P.

(57) ABSTRACT

The present invention discloses a process for forming a multiple layered coating film in three wet coating method, which the multiple layered coating film has excellent chipping resistance while maintaining smoothness between the coating films.

The present invention provides a process for forming a multiple layered coating film comprising the steps of forming an uncured first base coating film; an uncured second base coating film and an uncured clear coating film in order on an automobile body having an electrodeposition coating film on the surface thereof, and then simultaneously heating and curing the uncured coating films to form a multiple layered coating film,
wherein the multiple layered coating film comprising the first base coating film having the dry coating film thickness of 25 μm, the second base coating film having the dry coating film thickness of 10 μm and the clear coating film having the dry coating film thickness of 30 μm has an elongation at 20° C. of 40 to 60%, a tensile strength at 20° C. of 400 to 600 kgf/m² and a ratio of viscous term to elastic term (tan δ) at −20° C. of 0.04 to 0.06.

3 Claims, No Drawings

PROCESS FOR FORMING MULTIPLE LAYERED COATING FILM

TECHNICAL FIELD

The present invention relates to a process for forming a multiple layered coating film for an automobile. In more detail, the present invention relates to a process for forming a multiple layered coating film by three wet coating method, which the multiple layered coating film has excellent chipping resistance while maintaining smoothness.

BACKGROUND OF THE INVENTION

In automobile coating with a water-based base coating material, when a three-wet multiple layered coating film obtained by a three-wet coating method, which comprises the step of simultaneously heating and curing a uncured first base coating film, uncured second base coating film and uncured clear coating film formed on an automobile body having an electrodeposition coating film on the surface thereof is compared with a two-coat-one-bake multiple layered coating film obtained by a two-coat-one-bake coating method, which comprises the step of simultaneously heating and curing a uncured base coating film (hereinafter referred to as a "second base coating film") and uncured clear coating film formed on an automobile body having an electrodeposition coating film and an intermediate coating film (hereinafter referred to as a "first base coating film") in order on the surface thereof, it is necessary to thin the thickness of the first base coating film in the three-wet multiple layered coating film as compared with the thickness of the first base coating film in the two-coat-one-bake multiple layered coating film in order to secure the smoothness of the coating film. As the result, since the chipping resistance of the multiple layered coating film is reduced, it is problem that the multiple layered coating film is destroyed when a stepping stone collides with the coating film during while moving the automobile, a damage thereof is reached to the steel plate, and it cause the separation at the interface between the steel plate and electrodeposition coating film, or at the interface between the electrodeposition coating film and first base coating film.

A variety of methods for solving the problem of the reduction of the chipping resistance have been proposed.

For example, JP 2006-265535 A (Patent Document 1) discloses a water-based intermediate coating material comprising an acrylic emulsion resin produced from the specified unsaturated monomers, a hydroxyl group-containing resin, a curing agent and a color pigment having the specified solid content.

In addition, JP 2010-082554 A (Patent Document 2) discloses a process for forming a multiple layered coating film comprising the step of applying a chipping resistant coating material having the limited values of the physical properties of the coating film, intermediate coating material, base coating material and clear coating material in order to form a multiple layered coating film.

However, in the composition of Patent Document 1, since there is no linking group having a large cohesive force, such as urethane bond effective in the chipping resistance in the resin backbone, the chipping resistance in the intermediate coating film is insufficient. In addition, since the minimum melt viscosity is low in the three-wet coating method, and it is insufficient to control the mixture of layers between the intermediate coating material and the base coating material, it is problem thereby that the appearance of the three-wet coating film is poor as compared with the two-coat-one-bake coating film.

In addition, in the method of forming the coating film disclosed in Patent Document 2, since the intermediate coating film contains flat pigments, the impact relaxation when a stepping stone collides is dispersed in the horizontal direction of the coating film, and it is possible to suppress the separation at the interface between the steel plate and electrodeposition coating film, or at the interface between the electrodeposition coating film and intermediate coating film. However, it is problem that the area of the separation of the coating film in the horizontal direction of the intermediate coating film is increased, and the appearance of the automobile body is impaired.

PRIOR ART

Patent Documents

Patent Document 1: JP 2006-265535 A
Patent Document 2: JP 2010-082554 A

SUMMARY OF THE INVENTION

A main object of the present invention is to provide a process for forming a multiple layered coating film, which the multiple layered coating film has excellent chipping resistance while maintaining smoothness, in three wet coating method.

According to the present invention, the object described above has been accomplished by imparting the specified values of the physical properties to the multiple layered coating film, thereby providing the process for forming a multiple layered coating film of the present invention.

That is, the present invention provides

[1] a process for forming a multiple layered coating film comprising the steps of:

(1) applying a first water-based base coating material on an automobile body having an electrodeposition coating film on the surface thereof so as to have a dry coating film thickness of 10 to 40 μm to form an uncured first base coating film, (2) applying a second water-based base coating material on the uncured first base coating film formed in the step (1) so as to have a dry coating film thickness of 5 to 30 μm to form an uncured second base coating film, (3) heat-drying the uncured first base coating film and the uncured second base coating film formed in the steps (1) and (2), and then applying a clear coating material thereon so as to have a dry coating film thickness of 10 to 70 μm to form an uncured clear coating film, and (4) simultaneously heating and curing the uncured first base coating film, the uncured second base coating film and the uncured clear coating film formed in the steps (1), (2) and (3) to form a multiple layered coating film consisting of a first base coating film, second base coating film and clear coating film, wherein the multiple layered coating film comprising the first base coating film having the dry coating film thickness of 25 μm, the second base coating film having the dry coating film thickness of 10 μm and the clear coating film having the dry coating film thickness of 30 μm has an elongation at 20° C. of 40 to 60%, a tensile strength at 20° C. of 400 to 600 kgf/m$^2$ and a ratio of viscous term to elastic term (tan δ) at −20° C. of 0.04 to 0.06;

[2] The process for forming the multiple layered coating film according to [1], wherein the first water-based base coating comprises a water-dispersible polyurethane composition (A) comprising a polyisocyanate component (a1), polyol component (a2), amine component (a3), neutralizing component for carboxyl group (a4) and water (a5);

[3] The process for forming the multiple layered coating film according to [2], wherein the polyol component (a2) comprises a polycarbonate diol (a2-1) and a carboxyl group-containing diol (a2-2);

[4] The process for forming the multiple layered coating film according to [3], wherein the polycarbonate diol (a2-1) has a weight average molecular weight of 1,500 to 5,000.

[5] The process for forming the multiple layered coating film according to 1.5 [3] or [4], wherein the water-dispersible polyurethane composition comprises the polycarbonate diol (a2-1) and carboxyl group-containing diol (a2-2) in a molar ratio (a2-1:a2-2) of 1:0.8 to 1:2.

Effects of Invention

By using the process for forming the multiple layered coating film of the present invention, when the first base coating film, second base coating film and clear coating film have a given range of the film thickness respectively, the elongation at 20° C., the tensile strength at 20° C. and the ratio of viscous term to elastic term (tan δ) at −20° C. of the multiple layered coating film are within the specified range, and it is possible to provide the multiple layered coating film having excellent chipping resistance while maintaining smoothness.

DETAILED DESCRIPTION OF THE PREFERRED EMBODIMENTS

In the three wet coating method for simultaneously forming the first base coating film, the second base coating film and the clear coating film on the automobile body with the electrodeposition coating film, when the first base coating film has a dry coating film thickness of 25 μm, the second base coating film has a dry coating film thickness of 10 μm and the clear coating film has a dry coating film thickness of 30 μm in the multiple layered coating film formed, the present invention provides the process for forming the multiple layered coating film having an elongation at 20° C. of 40 to 60%, a tensile strength at 20° C. of 400 to 600 kgf/m² and a ratio of viscous term to elastic term (tan δ) at −20° C. of 0.04 to 0.06.

The process for forming the multiple layered coating film of the present invention comprises the steps of:
applying a first water-based base coating material on the automobile body having an electrodeposition coating film on the surface thereof,
applying a second water-based base coating material on it without curing the first water-based base coating material,
heat-drying the resulting uncured first base coating film and uncured second base coating film,
wet-on-wet coating a clear coating material,
simultaneously heating and curing the first base coating film, the second base coating film and the clear coating film to form a multiple layered coating film consisting of a first base coating film, second base coating film and clear coating film. The "wet-on-wet" as used herein refers to a coating method of overlaying a plurality of coating films without curing them.

In the process for forming the multiple layered coating film of the present invention, firstly, an automobile body having an electrodeposition coating film on the surface thereof is an article to be coated. The electrodeposition coating film is formed by applying an electrodeposition coating material on the automobile body and heating and curing the electrodeposition coating material. As materials of the automobile body include, for example, iron, copper, aluminum, tin and zinc as well as alloys containing these metals, and a plating or a vapor deposition article by these metals.

The electrodeposition coating, which is not particularly limited, can be used a cationic electrodeposition coating or anionic electrodeposition coating, which is well known in the art. However, it is preferable to use the cationic electrodeposition coating material having an excellent corrosion resistance. In addition, the electrodeposition coating and the heating and curing may be carried out in the methods and conditions commonly used for electrodeposition coating the automobile body.

Then, an uncured first base coating film is formed by applying a first water-based base coating material on the electrodeposited coating film. For example, the first water-based base coating material can be applied by spraying with an air electrostatic spray coater, which is so-called "react gun"; a rotary spray electrostatic coater, which is so-called "micro micro (μμ) bell", "micro (μ) bell", and "metallic (meta) bell"; and the like.

The first water-based base coating material is adjusted such that the resulting first base coating film has a dry coating film thickness of 10 to 40 μm, preferably 15 to 30 μm. When the film thickness is less than 10 μm, the appearance and chipping resistance of the resulting coating film are reduced. On the other hand, when the film thickness is more than 40 μm, there are problems such as the sagging of the coating material during the application thereof, the occurrence of pinholes when heating and curing the coating material.

Next, an uncured second base coating film is formed by applying a second water-based base coating material on the uncured first base coating film, and then the uncured first base coating film and uncured second base coating film are heat-dried.

The coating amount of the second water-based base coating material is adjusted such that the resulting second base coating film has a dry coating film thickness of 5 to 30 μm, preferably 5 to 25 μm. When the film thickness is less than 5 μm, the hiding of the substrate is not sufficient and the mottle is caused. On the other hand, when the film thickness is more than 30 μm, there are problems such as the sagging of the coating material during the application thereof, the occurrence of pinholes when heating and curing the coating material.

In view of the smoothness of the resulting multiple layered coating film, the resulting uncured first base coating film and the resulting uncured second base coating film are heat-dried prior to the application of the clear coating material. The drying condition is, for example, at 40 to 100° C. for 30 seconds to 10 minutes.

Subsequently, an uncured clear coating film is formed by applying a clear coating material on the uncured first base coating film and uncured second base coating film after heat-drying.

The coating amount of the clear coating material is adjusted such that the resulting clear coating film has a dry coating film thickness of 10 to 70 μm, preferably 15 to 60 μm. When the film thickness is less than 10 μm, there are problems such as the mottle during the application of the coating material and the lowering of appearance, such as a gloss of the multiple layered coating film. On the other hand, when the film thickness is more than 70 μm, there are problems that the lowering of smoothness of the coating film and the sagging of the coating material during the application thereof.

The uncured first base coating film, uncured second base coating film and uncured clear coating film are simultaneously heated and cured. The heating and curing are conducted by heating, for example, at the temperature of 110 to 180° C., preferably 120 to 160° C. Thereby, it is possible to obtain a multiple layered coating film cured at high degree of crosslinking. When the heating temperature is lower than 110° C., there is a possibility that the curing is not sufficient. On the other hand, when the heating temperature is higher than 180° C., there is a possibility that the resulting multiple layered coating film tends to become hard and brittle. Heating time can be suitably set depending on the temperature, but, for example, the heating time is 10 to 60 minutes if the temperature is 120 to 160° C.

The multiple layered coating film formed by the process for forming the multiple layered coating film of the present invention has an elongation at 20° C. of 40 to 60%, preferably 40 to 57%, if the dry coating film thickness of only the first base coating film is 25 μm, the dry coating film thickness of only the second base coating film is 10 μm, and the dry coating film thickness of only the clear coating film is 30 μm. When the elongation of the multiple layered coating film under the condition is less than 40%, the separation of the coating film in the chipping resistance test is large and increased, and the occurrence of rust is also increased. On the other hand, when the elongation of the multiple layered coating film is more than 60%, the water resistance and solvent resistance of the multiple layered coating film are poor. In addition, the multiple layered coating film of the present invention has a tensile strength at 20° C. of 400 to 600 kgf/m², preferably 450 to 550 kgf/m². When the tensile strength of the multiple layered coating film under the condition is less than 400 kgf/m², the separation of the coating film in the chipping resistance test is large and the solvent resistance of the multiple layered coating film is poor. On the other hand, when the tensile strength of the multiple layered coating film is more than 600 kgf/m², the occurrence of rust is increased. Furthermore, the multiple layered coating film of the present invention has a ratio of viscous term to elastic term (tan δ) at −20° C. of 0.04 to 0.06 under the condition. When the ratio (tan δ) under the condition is less than 0.04, the separation of the coating film in the chipping resistance test is large. On the other hand, when the ratio (tan δ) is more than 0.06, the occurrence of rust is increased.

Among the physical properties of the multiple layered coating film formed by the process for forming the multiple layered coating film of the present invention, the elongation and the tensile strength can be measured by a stress-strain characteristics measuring method. Concretely, a multiple layered coating film is formed by applying a first base coating material, a second base coating material and a clear coating material on a test plate of polypropylene using an air spray such that a dry coating film thickness of only a first base coating film is 25 μm, a dry coating film thickness of only a second base coating film is 10 μm, and a dry coating film thickness of only a clear coating film is 30 μm, and then heating and curing at 140° C. for 30 minutes; the resulting multiple layered coating film is separated from the test plate and is cut to the size of 10×70 mm; and it is used as a test specimen.

The stress-strain characteristics are measured at a measurement length of 50 mm, a temperature of 20° C., a tension speed of 10 mm/min by using "Autograph AGS-G type" and an analog meter (Shimadzu Corporation). The tensile strength is determined from a slope of the graph immediately after the tensile test. Furthermore, the elongation is determined from the elongation of the test specimen read from the graph. Concretely, the elongation is determined by the following formula:

$$\text{Elongation (\%)}=(L-50)/50\times100$$

wherein the length of the test specimen in the axis direction before the test is 50 (mm) and the length of the test specimen in the axis direction until the test specimen is broken is L (mm).

Moreover, in the measurement of the ratio of viscous term to elastic term (tan δ), a multiple layered coating film is formed by applying a first base coating material, a second base coating material and a clear coating material on a test plate of polypropylene using an air spray such that a dry coating film thickness of only a first base coating film is 25 μm, a dry coating film thickness of only a second base coating film is 10 μm, and a dry coating film thickness of only a clear coating film is 30 μm, and then heating and curing at 140° C. for 30 minutes; the resulting multiple layered coating film is separated from the test plate and is cut to the size of 5×20 mm; and it is used as a test specimen.

The tan δ at −20° C. is determined from the phase difference between the strain and vibration stress generated when rising the temperature by using a forced stretching vibration type viscoelasticity measuring apparatus (trade name "Vibron", Orientech Co.). The measurement frequency is 11 Hz and the temperature rising rate is 2° C./min.

The adjustment of the elongation, the tensile strength and the ratio of viscous term to elastic term (tan δ) of the multiple layered coating film will be described later.

The first water-based base coating material used in the process of the present invention comprises a water-dispersible polyurethane composition (A), a water-dispersible acrylic resin (B) and a curing agent (C).

Among them, the water-dispersible polyurethane composition (A) is formed from;

a polyisocyanate component (a1) containing diisocyanate as an essential component, which may contain other polyisocyanates as an optional 1.5 component;

a polyol component (a2) containing polycarbonate diol having a weight average molecular weight of 1,500 to 5,000 (a2-1) and carboxyl group-containing diol (a2-2) as essential components, which may contain other polyols as an optional component;

an amine component (a3) containing a monoamine compound as an essential component, which may contain a diamine compound as an optional component;

a neutralizing component for carboxyl group (a4); and water (a5).

The weight average molecular weight and number average molecular weight as used herein is a value measured with a polystyrene standard by GPC (gel permeation chromatography) method.

The diisocyanate, which is an essential component in the polyisocyanate component (a1) used in the present invention, is not particularly limited, and as the diisocyanate, a well-known diisocyanate may be used alone or in combination of two or more thereof. As the diisocyanate, cycloaliphatic diisocyanates are preferred because of excellent hydrolysis resistance of the resulting polyurethane molecule therefrom and the coating film obtained from the polyurethane molecule, and isophorone diisocyanate and dicyclohexylmethane-4,4'-diisocyanate is more preferable.

The diisocyanates may be used in the form of a carbodiimide-modified product, isocyanurate-modified product and biuret-modified product, or may be used in the form of a blocked isocyanate blocked with various blocking agents. In addition, the content of diisocyanate (% by mass) in the polyisocyanate component (a1) is preferably not less than 50%, more preferably not less than 70% or more. When the content of the diisocyanate is less than 50%, there is a possibility that the compatibility of the first water-based base coating material with other components is reduced.

The polycarbonate diol (a2-1), which is an essential component in the polyol component (a2) used in the present invention preferably, has a weight average molecular weight of 1,500 to 5,000. When the weight average molecular weight is less than 1,500, the adhesion of the coating film to the substrate is not sufficiently obtained. On the other hand, the weight average molecular weight is more than 5,000, the dispersion stability of the water-dispersible polyurethane composition (A) and the impact resistance of the coating film are reduced. In addition, examples of diols as a raw material for polycarbonate diol are not particularly limited, but include low molecular weight diols, such as ethylene glycol, 1,2-propanediol, 1,3-propanediol, 2-methyl-1,3-propanediol, 2-butyl-2-ethyl-1,3-propanediol, 1,4-butanediol, neopentyl glycol, 3-methyl-2,4-pentanediol, 2,4-pentanediol, 1,5-pentanediol, 3-methyl-1,5-pentanediol, 2-methyl-2,4-pentanediol, 2,4-diethyl-1,5-pentane diol, 1,6-hexane diol and the like, and 1,6-hexane diol is preferred because of low cost and easy availability thereof.

In addition, the carboxyl group-containing diol (a2-2) as another essential component of the polyol component (a2) is used to introduce the hydrophilic group into the polyurethane molecule. Since the hydrophilic group to be introduced is preferably in the form obtained by neutralizing a carboxyl group, examples of the carboxyl group-containing diols (a2-2) include, for example, dimethylol propionic acid, dimethylol butanoic acid, dimethylol butyric acid, dimethylol valeric acid and the like. The carboxyl group-containing diols may be used alone or in combination of two or more thereof.

In addition, the polyol compound, which may be optionally formulated as the polyol component (a2), is not particularly limited, and as the polyol compound, a well-known polyol may be used alone or in combination of two or more thereof. Examples of the polyol compounds include, for example, a low molecular weight polyol, polyether polyol, polybutadiene polyol, silicone polyol, a polyol having an ester bond and the like.

In the polyol component (a2) used in the present invention, the composition ratio (content) of the polycarbonate diol (a2-1) having a weight average molecular weight of 1,500 to 5,000 is preferably 50 to 97% by mass, more preferably 75 to 95% by mass. When the composition ratio of the polycarbonate diol (a2-1) is less than 50% by mass, there is a possibility that the coating film having a sufficient strength is not obtained. On the other hand, when the composition ratio is more than 97% by mass, there is a possibility that the water dispersibility of the resulting polyurethane composition is poor. In addition, the composition ratio of the carboxyl group-containing diol (a2-2) is preferably 3 to 30% by mass, more preferably 5 to 25% by mass. When the composition ratio of the carboxyl group-containing diol (a2-2) is less than 3% by mass, there is a possibility that the water dispersibility of the resulting polyurethane composition is insufficient. On the other hand, when the composition ratio is more than 30% by mass, there is a possibility that the strength and water resistance of the resulting coating film are poor. Moreover, a molar ratio ((a2-1:a2-2); formulation ratio) of the polycarbonate diol (a2-1) to the carboxyl group-containing diol (a2-2) contained in the polyol (a2) is preferably 1:0.8 to 1:2, more preferably 1:1 to 1:1.75, further preferably 1:1.2 to 1:1.5. When the molar ratio is more than 1:0.8 (the amount of the carboxyl group-containing diol (a2-2) is small), there is a possibility that the water dispersibility of the resulting polyurethane composition is reduced, and the storage stability of the coating material is reduced. On the other hand, when the molar ratio is less than 1:2 (the amount of the carboxyl group-containing diol (a2-2) is large), there is a possibility that the chipping resistance of the resulting multiple layered coating film is reduced.

The monoamine compound, which is an essential component in the amine component (a3) used in the present invention, is not particularly limited, and as monoamine compound a well-known monoamine compound may be used alone or in combination of two or more thereof. Examples of the monoamine compounds include alkylamines such as ethylamine, propylamine, 2-propylamine, butylamine, 2-butylamine, tert-butylamine, isobutylamine; aromatic amines such as aniline, methylaniline, phenylnaphthylamine, naphthylamine; cycloaliphatic amines such as cyclohexaneamine, methycyclohexaneamine; ether amines such as 2-methoxyethyl amine, 3-methoxypropylamine, 2-(2-methoxyethoxyl)ethylamine; alkanolamines such as ethanol amine, propanol amine, butylethanolamine, 1-amino-2-methyl-2-propanol, 2-amino-2-methylpropanol, diethanolamine, diisopropanolamine, dimethylaminopropylethanolamine, dipropanolamine, N-methylethanolamine, N-ethylethanolamine; and the like. Among them, the alkanolamine is preferable because it imparts good water dispersion stability to the polyurethane molecules.

The diamine compound, which may be optionally formulated as the amine component (a3) used in the present invention, is not particularly limited, and as the diamine compound a well-known diamine compounds may be used alone or in combination of two or more thereof.

The neutralizing agent used in the neutralizing component for carboxyl group (a4) used in the present invention is a basic compound which reacts with the carboxyl group of the carboxyl group-containing diol to form the hydrophilic salt. Examples of the basic compounds, which are not particularly limited, include, for example, tertiary amine compounds such as trialkyl amines including trimethylamine, triethylamine, tributylamine; N, N-dialkyl alkanolamines including N, N-dimethylethanolamine, N, N-dimethylpropanolamine, N, N-dipropylethanolamine, 1-dimethylamino-2-methyl-2-propanol; N-alkyl-N, N-di alkanolamines; trialkanolamines such as triethanolamine;

ammonia, trimethylammonium hydroxide, sodium hydroxide, potassium hydroxide, lithium hydroxide and the like. Among them, the tertiary amine compound is preferable, because the dispersion stability of the resulting water-dispersible polyurethane composition (A) is good.

The water-dispersible polyurethane composition (A) used in the present invention may contain an internal branching agent and internal crosslinking agent, which give a branched or crosslinked structure in the polyurethane molecules, in addition to components (a1) to (a5). Examples of the internal branching agent and internal crosslinking agent include, for example, melamine, methylolmelamine and the like.

The process for preparing the water-dispersible polyurethane composition (A) is not particularly limited, and well-known processes can be employed. The process comprising the steps of synthesizing a prepolymer or polymer in the solvent, which is inactive to the reaction and has high affinity with water, and feeding the prepolymer or polymer into water to disperse it in water is preferable. Examples of the processes include, for example, the process (i) comprising the steps of synthesizing a prepolymer from the polyisocyanate component (a1) and polyol component (a2), and reacting the prepolymer with the amine component (a3) in water, the process (ii) comprising the steps of synthesizing a polymer from the polyisocyanate component (a1), polyol component (a2) and amine component (a3), and feeding the polymer into water to disperse it in water and the like. The neutralizing component for carboxyl group (a4) may be previously added to water, into which the prepolymer or polymer is fed, or may be added after the feeding.

The process (i) is preferable as the process for preparing the water-dispersible polyurethane composition (A), because it is easy to control the composition and reaction and good dispersibility is obtained.

In addition, examples of the solvent, which is inactive to the reaction and has high affinity with water, used in the suitable process include, for example, acetone, methyl ethyl ketone, dioxane, tetrahydrofuran, N-methyl-2-pyrrolidone. The solvent is usually used in an amount of 3 to 100% by mass, based on the total amount of the raw materials used to prepare the prepolymer.

In the process for preparing the water-dispersible polyurethane 0.0 composition (A), a formulation ratio is not limited unless otherwise indicated. The formulation ratio can be replaced with a molar ratio of the isocyanate-reactive group in the polyol component (a2) and the amine component (a3) to the isocyanate group in the polyisocyanate component (a1) at the stage of reaction. The molar ratio of the isocyanate-reactive group in the polyol 1.5 component (a2) and the amine component (a3) to the isocyanate group in the polyisocyanate component (a1) is preferably within the range of 0.5 to 2.0. In addition, the molar ratio of the isocyanate-reactive group in the polyol component (a2) to the isocyanate group in the polyisocyanate component (a1) is preferably within the range of 0.3 to 1.0, more preferably 0.5 to 0.9. In addition, molar ratio of the isocyanate-reactive group in the amine component (a3) to the isocyanate group in the polyisocyanate component (a1) is preferably within the range of 0.1 to 1.0, more preferably 0.2 to 0.5. When unreacted isocyanate groups are present in an insufficient amount in the polyurethane molecule dispersed, there is a possibility that the coating film adhesion and the coating film strength are reduced. On the other hand, when unreacted isocyanate groups are present in an excess amount in the polyurethane molecule dispersed, there is a possibility that the unreacted isocyanate groups adversely affect the dispersion stability of the coating material and the physical properties of the resulting coating film.

In addition, the neutralization ratio by the neutralizing component for carboxyl group (a4) can be set within the range so as to give a sufficient dispersion stability to the resulting water-dispersible polyurethane composition (A). The amount of the neutralizing component for carboxyl group (a4) is preferably 0.5 to 2.0 mole equivalent, more preferably 0.7 to 1.5 mole equivalent, based on 1 mole of carboxyl group in the polyol component (a2).

The water-dispersible polyurethane composition (A) is in the form of emulsions, suspensions, colloidal dispersions, an aqueous solution and the like, and emulsifiers such as a surfactant can be used alone or in combination of two or more thereof in order to stabilize the dispersibility. The particle size in case of the emulsions, suspensions and colloidal dispersions, in which particles are dispersed in water, is not particularly limited, but in order to maintain a good dispersion state, a median diameter D50 is preferably 100 to 3,000 nm, more preferably 100 to 2,000 nm. The median diameter D50 can be measured, for example, by laser light scattering method.

As the emulsifier, an anionic surfactant or a nonionic surfactant well known in the art is preferred, because good dispersion or emulsification can be obtained.

As the amount of emulsifier, a mass ratio of the emulsifier to the polyurethane composition is preferably 0.01 to 0.3, more preferably 0.05 to 0.2. When the mass ratio is smaller than 0.01, there is a possibility that sufficient dispersibility is not obtained. On the other hand, when the mass ratio is larger than 0.3, there is a possibility that the physical properties such as water resistance, strength, elongation of the coating film obtained from the first water-based base coating material are reduced.

In addition, the solid content of the water-dispersible polyurethane composition (A) is preferably 10 to 70% by mass, more preferably 20 to 60% by mass, in the view of the dispersibility and coating workability.

The polyurethane composition dispersed in the water-dispersible polyurethane composition (A) has a number average molecular weight of preferably 5,000 to 200,000, more preferably 10,000 to 50,000. When the number average molecular weight is less than 5,000, there is a possibility that the chipping resistance is reduced. On the other hand, when the number average molecular weight is more than 200,000, there is a possibility that the washability of the coating material pipe in the coating line is reduced.

In addition, the hydroxyl value is not particularly limited, and any value can be selected, which is generally 0 to 100 mgKOH/g.

Next, the water-dispersible acrylic resin (B) used in the first water-based base coating material of the present invention can be obtained by emulsion polymerizing a monomer mixture of a (meth)acrylic acid alkylester (i), a carboxyl group-containing ethylenically unsaturated monomer (ii) and a hydroxyl-containing ethylenically unsaturated monomer (iii) using methods conventionally used in the art. The compound illustrated below as a component of the monomer mixture may be used alone or in combination of two or more thereof. The "meth (acrylic)" as used herein represents acrylic or methacrylic.

Among the monomers described above, the (meth)acrylic acid alkylester (i) is used to constitute a main skeleton of the acrylic resin emulsion.

Examples of the (meth)acrylic acid alkylesters (i) include, for example, methyl(meth)acrylate, ethyl(meth)acrylate, propyl(meth)acrylate, n-butyl(meth)acrylate, isobutyl(meth)acrylate, t-butyl(meth)acrylate, hexyl(meth)acrylate, 2-ethylhexyl(meth)acrylate, octyl(meth)acrylate, nonyl(meth)acrylate, decyl(meth)acrylate, dodecyl(meth)acrylate, stearyl(meth)acrylate and the like.

The carboxyl group-containing ethylenically unsaturated monomer (ii) is used to improve the storage stability, mechanical stability, stability to freezing and the like of the resulting acrylic resin emulsion, and to accelerate the curing reaction with a curing agent such as amino resin during the formation of the coating film.

Examples of the carboxyl group-containing ethylenically unsaturated monomers include, for example, acrylic acid, methacrylic acid, crotonic acid, isocrotonic acid, ethacrylic acid, propyl acrylic acid, isopropyl acrylic acid, itaconic acid, maleic anhydride, fumaric acid and the like.

The hydroxyl group-containing ethylenically unsaturated monomer (iii) is used to impart the hydrophilicity based on hydroxyl groups to the acrylic resin emulsion, to improve the storage stability, mechanical stability and stability to freezing when it is used as a coating material, and to impart the curing reactivity with the amino resin and polyisocyanate thereto.

Examples of the hydroxyl group-containing monomers (iii) include, for example, 2-hydroxyethyl(meth)acrylate, 2-hydroxypropyl(meth)acrylate, 4-hydroxybutyl(meth)acrylate, N-methylolacrylamide, and allyl alcohols, ε-caprolactone-modified acrylic monomer and the like.

The monomer mixture may contain as optional components at least one monomer selected from the group consisting of styrene-based monomers, (meth)acrylonitrile and (meth)acrylamide. Examples of the styrene-based monomers include, for example, α-methyl styrene in addition to styrene.

In addition, the monomer mixture may contain crosslinkable monomers, such as a carbonyl group-containing ethylenically unsaturated monomer, a hydrolyzable polymerizable silyl group-containing monomer, various polyfunctional vinyl monomers. In this case, the resulting water-dispersible acrylic resin emulsion is self-crosslinkable.

The emulsion polymerization can be carried out by heating the monomer mixture with stirring in the presence of a radical polymerization initiator and an emulsifier in an aqueous solution. The reaction temperature is, for example, preferably 30 to 100° C. and the reaction time is, for example, preferably 1 to 10 hours, and the reaction temperature may be adjusted by collectively adding or gradually dropping the monomer mixture or monomer pre-emulsion to a reaction vessel charged with water and an emulsifier.

As the radical polymerization initiator, well-known initiators conventionally used in the emulsion polymerization of acrylic resins can be used.

Examples of the emulsifiers, which are not particularly limited, include an anionic surfactant or a nonionic surfactant as described in the water-dispersible polyurethane composition (A). These may be used alone or in combination of two or more thereof.

The emulsion polymerization may be carried out by any polymerization methods, such as a conventional one stage continuous monomer uniform dropping method, a core-shell polymerization method, which is a multi-stage monomer feed process, a power feed polymerization method that continuously changes the monomer composition fed during the polymerization.

The mixture of the monomer components has a glass transition temperature (Tg) of preferably −50 to 20° C. By adjusting the Tg to the above range, when the first water-based base coating material comprising the water-dispersible acrylic resin (B) is used for the wet-on-wet coating method, an affinity and adhesion to the electrodeposition coating film and second water-based base coating material are improved, and the wettability with the second water-based base coating material in the wet state at the interface is good, thereby the inversion thereof is not caused. In addition, the resulting coated film has adequate flexibility, and the chipping resistance is improved. As the result, a multiple layered coating film having a good appearance can be formed. The glass transition temperature (Tg) is more preferably −40 to 10° C.

It is preferred that the mixture of the monomers component has an acid value of preferably 2 to 60 mgKOH/g. By adjusting the acid value to the above range, the storage stability, mechanical stability, stability to freezing and the like of the resin emulsion and the first water-based base coating material using the resin emulsion are improved, and the curing reaction during the formation of the coating film is sufficiently carried out, thereby the physical strength, chipping resistance, water resistance and the like of the coating film are improved. The acid value is more preferably 5 to 50 mgKOH/g.

The mixture of the monomer components has a hydroxyl value of preferably 10 to 120 mgKOH/g. By adjusting the hydroxyl value to the above range, the resin has a adequate hydrophilicity, the storage stability, mechanical stability, stability to freezing and the like are improved when using as the coating composition comprising the resin emulsion, and the curing reactivity with the melamine resin and isocyanate-based curing agent is sufficient. The hydroxyl value is more preferably 20 to 100 mgKOH/g.

In addition, the water-dispersible acrylic resin (B) is produced by adding a basic compound thereto in order to maintain the stability of the copolymer resin by neutralizing a part or all of the carboxylic acid of the resulting water-dispersible acrylic resin (B). As the basic compound, ammonia, various amines, alkali metal and the like are usually used, and are suitably used also in the present invention.

In the present invention, a first water-based base coating material is formed by adding a curing agent (C) to the water-dispersible polyurethane composition (A) and the water-dispersible acrylic resin (B).

The curing agent (C) is not particularly limited as long as the curing reaction with one or both of the water-dispersible polyurethane composition (A) and the water-dispersible acrylic resin (B) can be carried out and it can be incorporated into the first water-based base coating material, but, for example, amino resins and/or blocked isocyanate resins are particularly preferred.

Examples of the amino resins, which are not particularly limited, include, for example, a methylated melamine resin, a butylated melamine resin or a methyl/butyl mixed melamine resins. Examples of the amino resins, which are commercially available, include, for example, "Cymel" series, such as "Cymel 303", "Cymel 254"; and "U-VAN" series, such as "U-VAN 226" and "U-VAN 20N60", which are commercially available from Mitsui Chemicals, Inc.; "SUMIMAL" series, which are commercially available from Sumitomo Chemical Co., Ltd.; and the like.

Furthermore, the blocked isocyanate resin is obtained by the addition of a blocking agent having an active hydrogen to polyisocyanate, and the blocking agent is dissociated by heating to generate an isocyanate group, which reacts with the functional groups of the water dispersible polyurethane composition (A) and the water-dispersible acrylic resin (B) to cure the coating material.

The blocked isocyanate resins are not particularly limited, but examples of representative polyisocyanates include, for example, aliphatic isocyanates such as trimethylene diisocyanate, tetramethylene diisocyanate, pentamethylene diisocyanate, hexamethylene diisocyanate, trimethylhexamethylene diisocyanate;
aliphatic cyclic isocyanates such as 1,3-cyclopentane diisocyanate, 1,4-cyclohexane diisocyanate, 1,2-cyclohexane diisocyanate; aromatic isocyanates such as xylylene diisocyanate, 2,4-tolylene diisocyanate, 2,6-tolylene diisocyanate; alicyclic isocyanates such as isophorone diisocyanate, norbornane diisocyanate methyl; multimers such as isocyanurate thereof and mixtures thereof.

Examples of the blocking agents include, for example, aliphatic, aromatic or heterocyclic alcohols such as halogenated hydrocarbons, methanol, ethanol, n-propanol, isopropanol, furfuryl alcohol, alkyl group-substituted furfuryl alcohol, benzyl alcohol; oximes such as methyl ethyl ketone oxime, methyl isobutyl ketone oxime, acetone oxime, cyclohexane oxime; and caprolactam. Among them, oximes, alcohols are preferred. In addition, it is possible to use a catalyst to dissociate the blocking agent in the first water-based base coating material.

With respect to the chipping resistance of the multiple layered coating film, the elongation and tensile strength of the multiple layered coating film and the value of tan δ showing the balance between the elongation and tensile strength are very important from the viewpoint of energy propagation and cushioning action of an external force. When the multiple layered coating film has large elongation and small tensile strength, the damage generated by chipping tends to be large. On the other hand, when the multiple layered coating film has small elongation and large tensile strength, the damage generated by chipping tends to be deep. In addition, the chipping resistance is determined by the value of tan δ showing the balance between the elongation and tensile strength.

The solid content of the water-dispersible polyurethane composition (A) in the resin solid content of the first water-based base coating affects the elongation, tensile strength and the ratio of viscous term to elastic term (tan δ) of the final resulting multiple layered coating film. When the solid content is increased, there is a tendency that the elongation increases and the tensile strength decreases. The solid content is preferably 20 to 40% by mass, more preferably 25 to 35% by mass. When the solid content is smaller than 20% by mass, the effects of improving the chipping resistance of the resulting multiple layered coating film are reduced. On the other hand, when the solid content is larger than 40% by mass, there is a tendency that the solvent resistance of the resulting multiple layered coating film is reduced. In either case, there is a possibility that the effects of the present invention cannot be accomplished.

In addition, the solid content of the water-dispersible acrylic resin (B) is within the range of preferably 5 to 10% by mass, based on the resin solid content of the coating material. When the solid content of the water-dispersible acrylic resin (B) is smaller than 5% by mass, there is a tendency that the chipping resistance of the resulting multiple layered coating film is reduced. On the other hand, when the solid content is larger than 10% by mass, there is a tendency that the water resistance of the resulting multiple layered coating film is reduced. In either case, there is a possibility that the effects of the present invention cannot be accomplished.

In addition, the solid content of the curing agent (C) in the resin solid content of the first water-based base coating is within the range of 5 to 50% by mass, more preferably 5 to 30% by mass, based on the resin solid content of the coating material. When the solid content of the curing agent (C) is smaller than 5% by mass, there is a tendency that the water resistance of the resulting multiple layered coating film is reduced. On the other hand, when the solid content is larger than 50% by mass, there is a tendency that the chipping resistance of the resulting multiple layered coating film is reduced.

The first water-based base coating material of the present invention can contain various additives, such as other resin components, various organic or inorganic color pigments and extender pigments, thickeners and the like, in addition to the water-dispersible polyurethane composition (A), the water-dispersible acrylic resin (B) and the curing agent (C).

Examples of the other resin components, which are not particularly limited, include, for example, water-soluble acrylic resins other than those described above, water-soluble polyester resins and the like. The resin components is preferably contained in an amount of 50% by mass or less, based on the solid content of the all resins contained in the first water-based base coating material.

Among them, the water-soluble acrylic resins can be obtained by the solution polymerization of a mixture of polymerizable unsaturated monomers. Examples of the polymerizable unsaturated monomers include the (meth)acrylic acid alkylester (i), the carboxyl group-containing ethylenically unsaturated monomer (ii) and the hydroxyl-containing ethylenically unsaturated monomer (iii) as described in the water-dispersible acrylic resin (B).

For example, the water-soluble acrylic resin can be used after neutralizing it with basic compounds, such as organic amines including, for example, monomethylamine, dimethylamine, trimethylamine, triethylamine, diisopropylamine, monoethanolamine, diethanolamine and dimethylethanolamine, and then dissolving it in water.

The water-soluble acrylic resin has an acid value of the resin solid content of preferably 35 to 100 mg/KOH, more preferably 40 to 80 mg/KOH. When the acid value of the resin solid content is larger than 100 mg/KOH, there is a possibility that the water resistance of the coating film is reduced. On the other hand, when the acid value is smaller than 35 mg/KOH, there is a possibility that the water-solubilization of the resin is insufficient. In addition, the water-soluble acrylic resin has a number-average molecular weight of preferably 3,000 to 15,000. When the number-average molecular weight is higher than 15,000, there is a possibility that the coating viscosity is too high. On the other hand, when the number-average molecular weight is lower than 3,000, there is a possibility that the water resistance of the coating film is reduced.

Examples of the water-soluble polyester resins include, for example, polyester resins formed by condensation of an alcohol component and an acid component; alkyd resins obtained by adding an oil component to the alcohol component and the acid component and then reacting the three components; and the like. Examples of the alcohol components include, for example, diols such as ethylene glycol, diethylene glycol, propylene glycol, 1,3-propanediol, 1,4-butanediol, 1,5-pentanediol, 1,6-hexanediol, 2,2-diethyl-1,3-propanediol, neopentyl glycol, 1,9-nonanediol, 1,4-cyclohexane diol, hydroxypivalic acid neopentyl glycol ester, 2-butyl-2-ethyl-1,3-propanediol, 3-methyl-1,5-pentanediol, 2,2,4-trimethylpentane diol and hydrogenated bisphenol A; and polyvalent alcohol components (trivalent or more) such as trimethylol propane, trimethylol ethane, glycerol, and pentaerythritol. Examples of the acid components include, for example, aromatic polyvalent carboxylic acids and anhydrides, such as phthalic anhydride, isophthalic acid, terephthalic acid, trimellitic anhydride, tetrabromophthalic anhydride, tetrachlorophthalic anhydride and pyromellitic anhydride; alicyclic polycarboxylic acids and anhydrides, such as hexahydrophthalic anhydride, tetrahydrophthalic anhydride, 1,4- and 1,3-cyclohexane dicarboxylic acid; and polybasic acid components, such as maleic anhydride, fumaric acid, succinic anhydride, adipic acid, sebacic acid, azelaic acid. Examples of the oil components include, for example, fatty acids such as castor oil, dehydrated castor oil, tung oil, safflower oil, soybean oil, linseed oil, tall oil and coconut oil; and mixtures of two or more thereof.

The water-soluble polyester resin may be used after neutralizing it with the basic compound described in the water-soluble acrylic resin and then dissolving it in water.

The water-soluble polyester resin has a number average molecular weight of, preferably 800 to 10,000, more preferably 1,000 to 8,000. When the number average molecular weight is lower than 800, the stability when water solubilizing polyester resins is reduced. On the other hand, when the number average molecular weight is higher than 10,000, the viscosity of the resin is increased, and the solid content of the coating material is decreased, thereby the coating workability is reduced.

The water-soluble polyester resin has an acid value of the solid content of preferably 15 to 100 mgKOH/g, more preferably 20 to 80 mgKOH/g. When the acid value of the solid content is smaller than 15 mgKOH/g, the stability of the polyester resin in water system is reduced. On the other hand, when the acid value of the solid content is larger than 100 mgKOH/g, the water resistance of the resulting coating film is reduced.

Examples of the color pigments include, for example, organic color pigments such as azo lake pigments, insoluble azo pigments, condensed azo pigments, phthalocyanine pigments, indigo pigments, perinone pigments, perylene pigments, dioxazine pigments, quinacridone pigments, isoindolinone pigments and metal complex pigments and inorganic color pigments such as chrome yellow, yellow iron oxide, red iron oxide, carbon black, titanium dioxide. Examples of the extender pigments include calcium carbonate, barium sulfate, clay and talc. For example, those described in the base coating material can be used. In addition, the flat pigments such as aluminum powder, graphite powder may be used.

The pigment has a ratio of mass of the pigment to the total mass of the solid content of the resin and pigment contained in the first water-based base coating material (PWC; pigment weight content) of preferably 10 to 60% by mass. When the ratio is less than 10% by mass, there is a possibility that the hiding of the substrate is reduced. On the other hand, when the ratio is more than 60% by mass, the viscosity of the coating material is increased when curing the coating material, and there is a possibility that the smoothness of the resulting multiple layered coating film is reduced.

The process for preparing the first water-based base coating material of the present invention is not particularly limited, and may be used any method known by a person with ordinary skill in the art. In addition, the first water-based base coating material of the present invention is not particularly limited with respect to the form thereof as long as it is in the form of water-based, and it may be in the form of, for example, water-soluble, water-dispersible and a water-based emulsion and the like.

Next, the second water-based base coating used in the process of the present invention is not limited, but, for example, those containing a coating film-forming resin, a curing agent, pigments such as a bright pigment, a color pigment and extender pigment and various additives may be used. Examples of the coating film-forming resins include, for example, polyester resin, acrylic resin, urethane resin, carbonate resin and epoxy resin. From the viewpoint of the pigment dispersibility and workability, the combination of the acrylic resin and/or polyester resin and a melamine resin is preferred. As the curing agent, pigment and various additives, those used in the first water-based base coating material as described above may be used. The preparation of the second water-based base coating material can be also carried out by a method similar to the preparation of the first water-based base coating material.

The concentration of the pigment (PWC) contained in the second water-based base coating material is within the range of preferably 0.1 to 50% by mass, more preferably 0.5 to 40% by mass, further preferably 1 to 30% by mass. When the concentration of the pigment is less than 0.1% by mass, the effects accomplished by the pigment are not obtained. On the other hand, when the concentration of the pigment is more than 50% by mass, there is a possibility that the appearance of the resulting coating film is reduced.

The second water-based base coating material is not particularly limited with respect to the form thereof, and it may be in the form of water-soluble, water-dispersible or an emulsion.

In addition, the clear coating material used in the process of the present invention is not particularly limited, but, for example, those containing a coating film-forming resin, a curing agent and other additives may be used. Examples of the coating film-forming resins, which are not particularly limited, include, for example, acrylic resin, polyester resin, epoxy resin and urethane resin. These may be used in combination of curing agents such an amino resin and/or an isocyanate resin. From the viewpoint of the transparency or acid etch resistance, the combination of the acrylic resin and/or polyester resin and an amino resin, or the acrylic resin and/or polyester resin having carboxylic acid-epoxy curing system is preferred. The coating material form of the clear coating material may be organic solvent-based type, water-based type (a water-soluble, water-dispersible, emulsion), non-water-dispersible type or powder type, and if necessary, a curing catalyst, a surface conditioner and the like can be also used.

EXAMPLES

The present invention is more concretely illustrated below according to Examples, but the present invention is not limited only to these Examples. In Examples, unless otherwise noted, "parts" and "%" are by mass basis.

Preparation Example 1

Preparation of Water-Dispersible Polyurethane Composition A

A 0.26 parts by mole of polycarbonate diol having a weight average molecular weight of 2,000 obtained from 1,6-hexanediol, 1.0 part by mole of isophorone diisocyanate and 0.36 parts by mole of dimethylolpropionic acid, and 39% by mass of the total mass thereof of N-methyl-2-pyrrolidone were charged to a reaction flask, and then were reacted at 125° C. for 2 hours under a nitrogen stream to obtain a prepolymer. A silicone-based anti-foaming agent SE-21 (trade name, Wacker silicones) of 0.25 g, 22.0 g of triethylamine, 0.315 g of ethylenediamine and 5.35 g of monoethanolamine were dissolved in 600 g of water, and then 500 g of the resulting prepolymer as described above was dropped for 15 minutes therein. Stirring was continued at 40° C. until the disappearance of the absorption based on an isocyanate group in the IR measurement to obtain a water-dispersible polyurethane composition A having a solid content of 31.5%. The polyurethane composition dispersed therein had a number average molecular weight of 30,000 measured by GPC method with polystyrene standards.

Preparation Example 2

Preparation of Water-Dispersible Polyurethane Composition B

A 0.13 parts by mole of polycarbonate diol having a weight average molecular weight of 2,000 obtained from 1,6-hexanediol, 1.0 part by mole of isophorone diisocyanate and 0.36 parts by mole of dimethylolpropionic acid, and 40% by mass of the total mass thereof of N-methyl-2-pyrrolidone were charged to a reaction flask, and then were reacted at 125° C. for 2 hours under a nitrogen stream to obtain a prepolymer. The silicone-based anti-foaming agent SE-21 of 0.25 g, 31.0 g of triethylamine, 0.315 g of ethylenediamine and 5.35 g of monoethanolamine were dissolved in 600 g of water, and then 500 g of the resulting prepolymer as described above was dropped for 15 minutes therein. Stirring was continued at 40° C. for 30 minutes until the disappearance of the absorption based on an isocyanate group in the IR measurement to obtain a water-dispersible polyurethane composition B having a solid content of 32.0%. The polyurethane composition dispersed therein had a number average molecular weight of 22,000 measured as described in Preparation example 1.

Preparation Example 3

Preparation of Water-Dispersible Polyurethane Composition C

A 0.26 parts by mole of polycarbonate diol having a weight average molecular weight of 1,000 obtained from 1,6-hexanediol, 1.0 part by mole of isophorone diisocyanate and 0.36 parts by mole of dimethylolpropionic acid, and 40% by mass of the total mass thereof of N-methyl-2-pyrrolidone were charged to a reaction flask, and then were reacted at 125° C. for 2 hours under a nitrogen stream to obtain a prepolymer. The silicone-based anti-foaming agent SE-21 of 0.25 g, 22.0 g of triethylamine, 0.315 g of ethylenediamine and 5.35 g of monoethanolamine were dissolved in 600 g of water, and then 500 g of the resulting prepolymer as described above was dropped for 15 minutes therein. Stirring was continued at 40° C. for 30 minutes until the disappearance of the absorption based on an isocyanate group in the IR measurement to obtain a water-dispersible polyurethane composition C having a solid content of 31.7%. The polyurethane composition dispersed therein had a number average molecular weight of 17,000 measured as described in Preparation example 1.

Preparation Example 4

Preparation of Water-Dispersible Polyurethane Composition D

A 0.26 parts by mole of polycarbonate diol having a weight average molecular weight of 1,000 obtained from 1,6-hexanediol, 1.0 part by mole of dicyclohexyl methane-4,4'-diisocyanate and 0.36 parts by mole of dimethylolpropionic acid, and 40% by mass of the total mass thereof of N-methyl-2-pyrrolidone were charged to a reaction flask, and then were reacted at 125° C. for 2 hours under a nitrogen stream to obtain a prepolymer. The silicone-based anti-foaming agent SE-21 of 0.25 g, 22.00 g of triethylamine, 0.315 g of ethylenediamine and 5.35 g of monoethanolamine were dissolved in 600 g of water, and then 500 g of the resulting prepolymer as described above was dropped for 15 minutes therein. Stirring was continued at 40° C. for 30 minutes until the disappearance of the absorption based on an isocyanate group in the IR measurement to obtain a water-dispersible polyurethane composition D having a solid content of 31.7%. The polyurethane composition dispersed therein had a number average molecular weight of 15,000 measured as described in Preparation example 1.

Preparation Example 5

Preparation of Water-Dispersible Acrylic Resin

A 445 parts of water and 5 parts of Newcol 293 (anionic emulsifier manufactured by Nippon Nyukazai Co., Ltd.) were charged to a reaction vessel conventionally used for preparing acrylic resin emulsion with a stirrer, a thermometer, a dropping funnel, a reflux condenser and a nitrogen inlet tube, and the temperature was raised to 75° C. with stirring. The mixture of monomer mixture (resin acid value: 18 mgKOH/g, resin hydroxyl value: 85 mgKOH/g, Tg: −22° C.) of 45 parts of methyl methacrylate, 299 parts of butyl acrylate, 50 parts of styrene, 92 parts of 2-hydroxyethyl acrylate, 14 parts of methacrylic acid and 20 parts of ethylene glycol dimethacrylate; 240 parts of water; and 30 parts of Newcol 293 was emulsified with a homogenizer to form a monomer pre-emulsion. The monomer pre-emulsion was dropped to the reaction vessel for 3 hours with stirring. In parallel with the dropping of the monomer pre-emulsion, an aqueous solution prepared by dissolving 1 part of ammonium persulfate as a polymerization initiator in 50 parts of water was evenly dropped to the reaction vessel until the dropping of the monomer pre-emulsion was completed. After the completion of the dropping of the monomer pre-emulsion, the reaction was further continued for 1 hour at 80° C., and then cooled. After cooling, an aqueous solution prepared by dissolving 2 parts of dimethylamino ethanol in 20 parts of water was poured in the reaction vessel to obtain water-dispersible acrylic resin having a nonvolatile component of 40.6% by mass.

The resulting water-dispersible acrylic resin was adjusted to a pH of 7.2 by using a 30% aqueous solution of dimethylaminoethanol.

Preparation Example 6

Preparation of Water-Soluble Acrylic Resin

A 76 parts of ethylene glycol monomethyl ether was charged in a reaction vessel, and then 60 parts of a monomer mixture consisting of 45 parts of styrene, 63 parts of methyl methacrylate, 48 parts of 2-hydroxyethyl methacrylate, 117 parts of n-butyl acrylate, 27 parts of methacrylic acid and 3 parts of azobisisobutyronitrile was added thereto and the temperature was raised to 120° C. with stirring. At the time of reaching the temperature of 120*C, 243 parts of the monomer mixture was dropped at the constant speed for 3 hours, and then reacted further at the temperature for 1 hour to obtain an acrylic resin having an acid value of 58 mgKOH/g, a hydroxyl value of 70 mgKOH/g and a number average molecular weight of 10,000. It is neutralized with dimethyl ethanolamine to obtain a water-soluble acrylic resin having a neutralization rate of 80% and a non-volatile content of 50% by mass.

Preparation Example 7

Preparation of Water-Soluble Polyester Resin

A 20.51 parts of ethylene glycol, 12.91 parts of trimethylolpropane and 51.70 parts of phthalic anhydride were added, and then the esterification reaction was carried out at 160 to 220° C. for 5 hours. A 14.88 parts of trimellitic anhydride was further added, and then reacted at 180° C. for 1 hour to obtain a polyester resin having an acid value of 50 mgKOH/g, a hydroxyl value of 60 mgKOH/g and a number-average molecular weight of 2,000. It is neutralized with dimethyl ethanolamine to obtain a water-soluble polyesrer resin having a neutralization rate of 80% and a non-volatile content of 35% by mass.

Example 1

Preparation of First Water-Based Base Coating Material

After mixing 8.4 parts of Cymel 327 (trade name, melamine resin manufactured by Nihon Cytec Industries Co., Ltd.) (solid content of 7.6 parts) as a curing agent with 28.3 parts of the water dispersible polyurethane composition (A) (solid content of 8.9 parts), 4.9 parts of the water-dispersible acrylic resin (solid content of 2.0 parts), 10.6 parts of water-soluble acrylic resin (solid content of 5.3 parts) and 15.1 parts of water-soluble polyester resin (solid content of 5.3 parts), Adekanol UH814 (trade name, urethane associative thickener manufactured by ADEKA Corporation) was mixed with stirring to obtain a first water-based base coating material containing the water-dispersible polyurethane composition (A) at a solid content of 30 parts as solids, based on 100 parts of the total resin solid content of the coating materials.

As pigments, 27 parts of rutile titanium oxide, 48 parts of barium sulfate and 9 parts of carbon black were formulated, based on 100 parts of the total resin solid content of the coating materials.

The pigment was pre-mixed with the water-soluble acrylic resin, a demineralized water and an anti-foaming agent, and then was dispersed in a glass bead media by using a paint conditioner.

Preparation of Second Water-Based Base Coating Material

Aqua Rex AR-2100NH-730 (trade name, water-based solid base coating material manufactured by Nippon Paint Co., Ltd.) and the water-dispersible polyurethane composition (A) were mixed and stirred such that the solid content was 30 parts, based on 100 parts of the resin solid content of the Aqua Rex AR-2100NH-730, to obtain a second water-based base coating material.

Formation of Multiple Layered Coating Film

Powernics 150 (trade name, cationic electrodeposition coating material manufactured by Nippon Paint Co., Ltd.) was electrodeposition coated on dull steel sheet treated with zinc phosphate such that the thickness of the dry coating film was 20 μm, and then heat-cured at 160° C. for 30 minutes. After heat-curing, it is cooled to prepare a steel substrate.

The first water-based base coating material was coated on the resulting substrate obtained by using a rotary atomization type electrostatic coating device such that the thickness of the dry coating film was 25 μm, and then the second water-based base coating material was coated thereon by using a rotary atomization type electrostatic coating device such that the thickness of the dry coating film was 10 μm, followed by preheating at 80° C. for 3 minutes. The second water-based base coating material was coated after an interval of 6 minutes from the coating of the first water-based base coating material. In addition, Super rack O-100 (trade name, acrylic melamine type clear coating material manufactured by Nippon Paint Co., Ltd.) was coated thereon as a clear coating by using a rotary atomization type electrostatic coating device such that the thickness of the dry coating film was 30 μm, and then was heated and cured at 140° C. for 30 minutes to obtain a test specimen, on which formed of the multiple layered coating film was formed.

Further, a multiple layered coating film was formed as described above, except that a test plate of polypropylene was used in place of the steel substrate and an air spray was used in place of the rotary atomization type electrostatic coating device. After that, the resulting multiple layered coating film is cut to the size of 10×70 mm from the test plate of polypropylene to prepare a test specimen for measuring the stress-strain characteristics and the resulting multiple layered coating film is cut to the size of 5×20 mm from the test plate to prepare a test specimen for measuring the viscoelasticity.

Evaluation Test

Stress-Strain Characteristics

<Elongation, Tensile Strength>

Stress-strain characteristics were measured at a measurement length of 50 mm, a temperature of 20° C., a tension speed of 10 mm/min using the prepared test specimen with Autograph AGS-G type and an analog meter (manufactured by Shimadzu Corporation). The tensile strength was determined from a slope of the graph immediately after the tensile test. Furthermore, the elongation was determined from the elongation of the test specimen read from the graph. Concretely, the elongation was determined by the following formula:

$$\text{Elongation (\%)} = (L-50)/50 \times 100$$

wherein the length of the test specimen in the axis direction before the test is 50 (mm) and the length of the test specimen in the axis direction until the test specimen is broken is L (mm).

<Ratio of Elastic Term to Viscous Term (Tan δ)>

The tan δ at −20° C. was determined from the phase difference between the strain and vibration stress generated when rising the temperature by using a forced stretching vibration type viscoelasticity measuring apparatus (trade name "Vibron", Orientech Co.). The measurement frequency was 11 Hz and the temperature rising rate is 2° C./min.

Chipping Resistance

A 50 g of 7 grade crushed stones were collided from a distance of 35 cm to the multiple layered coating film of the test specimen at an air pressure of 2 kgf/cm² and an angle of 90° by using a Gras Belo testing machine (manufactured by Suga Test Instruments Co., Ltd.). After water washing and drying the test specimen, a piece of the coating film separated from it by using a industrial gum tape manufactured by Nichiban Co. industrial was remove from there, and then the degree of the separation of the coating film was evaluated by visual observation. Thereafter, salt spray test was carried out, the state of rust caused when the damage reached the steel plate was evaluated by visual observation. The separation of the coating film and the state of rust were evaluated by the following evaluation criteria. The results thereof are shown in Table 1.

Evaluation Criteria

1: Very little.

2: Few damages and rust are present, but there is no problem as the appearance.

3: Slightly large or slightly many damages and rust are present, and there is a problem as the appearance.

4: Large or many damages and rust are present.

5: Very large or very many damages and rust are present.

Water Resistance (Shrinkage Phenomenon)

After immersing the test specimen containing the multiple layered coating film formed thereon for 10 days in warm water at 40° C., the test specimen was taken out, and the shrinkage phenomenon on the surface of the coating film caused by the swelling of the coating film of the test specimen was evaluated by visual observation. The test specimen, which the shrinkage phenomenon was not caused, was evaluated as "o" and the test specimen, which the shrinkage phenomenon was caused, was evaluated as "x". The results are shown in Table 1.

Solvent Resistance (Xylene Drops)

One drop of (0.1~0.3 cc) xylene was dropped on the test specimen containing the multiple layered coating film formed thereon, and the xylene was wiped after standing the test specimen at room temperature for 30 minutes. The swelling at the site of the coating film and the shrinkage phenomenon on the surface of the coating film caused by the swelling was evaluated by visual observation. The test specimen, which the swelling and shrinkage phenomenon was not caused, was evaluated as "o" and the test specimen, which the swelling and shrinkage phenomenon was caused, was evaluated as "x". The results are shown in Table 1.

Examples 2 to 5 and Comparative Examples 1 to 9

As shown in Table 1, the first water-based base coating material and second water-based base coating material, in which the water-dispersible polyurethane composition (A) was contained in a given amount as the solid content, based on 100 parts of the resin solid content of the coating film, were obtained respectively, as described in Example 1.

Further, as described in Example 1, the test specimen containing the multiple layered coating film formed thereon was obtained, and then the various evaluation tests were carried out. The results are shown in Table 1. As the clear coating materials for Examples 2 to 5 and Comparative Example 7, Mack flow O-1900 (trade name, acid-epoxy curing type clear coating manufactured by Nippon Paint Co., Ltd.) was used in place of the O-100.

As is apparent from the results shown in Table 1, the multiple layered coating films of Examples 1 to 5 of the present invention having an elongation at 20° C. of 40 to 60%, a tensile strength at 20° C. of 400 to 600 kgf/m² and a ratio of viscous term to elastic term (tan δ) at −20° C. of 0.04 to 0.06 have excellent physical properties, which accomplish all desired values and testing requirements. On the other hand, the multiple layered coating films of Comparative Examples 1 to 9, which at least one of the elongation, tensile strength and tan δ values is out of the specified range, at least one of the chipping resistance, water resistance and solvent resistance is poor.

INDUSTRIAL APPLICABILITY

The process for forming a multiple layered coating film of the present invention can be used for forming a multiple layered coating film having good appearance and excellent chipping resistance on automobile body.

What is claimed is:
1. A process for forming a multiple layered coating film comprising the steps of:
   (1) applying a first water-based base coating material on an automobile body having an electrodeposition coating film on a surface thereof so as to have a dry coating film thickness of 10 to 40 μm to form an uncured first base coating film,
   (2) applying a second water-based base coating material on the uncured first base coating film formed in the step (1) so as to have a dry coating film thickness of 5 to 30 μm to form an uncured second base coating film,
   (3) heat-drying the uncured first base coating film and the uncured second base coating film formed in the steps (1) and (2), and then applying a clear coating material thereon so as to have a dry coating film thickness of 10 to 70 μm to form an uncured clear coating film, and
   (4) simultaneously heating and curing the uncured first base coating film, the uncured second base coating film and the uncured clear coating film formed in the steps (1), (2) and (3) to form a multiple layered coating film

TABLE 1-1

| Comparative | First WBB | | Second WBB | | |
|---|---|---|---|---|---|
| | Type of WDP | Amount of WDP (%) | Type of WDP | Amount of WDP (%) | Clear coating material |
| Ex-1 | A | 30 | A | 30 | O-100 |
| Ex-2 | A | 30 | — | 0 | O-1900 |
| Ex-3 | A | 35 | — | 0 | |
| Ex-4 | A | 25 | — | 0 | |
| Ex-5 | A | 40 | — | 0 | |
| CEx-1 | B | 30 | — | 0 | O-100 |
| CEx-2 | — | 0 | — | 0 | |
| CEx-3 | C | 30 | — | 0 | |
| CEx-4 | D | 30 | — | 0 | |
| CEx-6 | A | 50 | A | 30 | O-100 |
| CEx-7 | A | 15 | A | 30 | O-1900 |
| CEx-8 | A | 30 | A | 50 | O-100 |
| CEx-9 | A | 50 | A | 40 | |

Ex: Example
CEx: Comparative Example
WBB: Water-based base coating material
WDP: Water-dispersible polyurethane composition

TABLE 1-2

| | Stress-strain characteristics | | | Chipping resistance | | Water resistance Swelling | Solvent resistance Swelling |
|---|---|---|---|---|---|---|---|
| | Elongation | Tensile strength | viscoelasticity | Separation | Rust | shrinkage | shrinkage |
| | (%) | (kgf/m²) | tan δ | | | | |
| Ex-1 | 41.6 | 493 | 0.053 | 2 | 1 | o | o |
| Ex-2 | 40.4 | 434 | 0.044 | 2 | 1 | o | o |
| Ex-3 | 48.9 | 420 | 0.050 | 2 | 1 | o | o |
| Ex-4 | 40.2 | 530 | 0.041 | 2 | 1 | o | o |
| Ex-5 | 55.8 | 439 | 0.055 | 2 | 1 | o | o |
| CEx-1 | 30.5 | 472 | 0.038 | 3 | 1 | o | o |
| CEx-2 | 3.2 | 466 | 0.049 | 3 | 3 | o | o |
| CEx-3 | 36.6 | 470 | 0.049 | 3 | 2 | o | o |
| CEx-4 | 38.8 | 448 | 0.050 | 3 | 1 | o | o |
| CEx-6 | 45.0 | 358 | 0.045 | 4 | 1 | o | x |
| CEx-7 | 41.0 | 620 | 0.054 | 4 | 3 | o | o |
| CEx-8 | 64.9 | 455 | 0.049 | 1 | 1 | x | x |
| CEx-9 | 42.0 | 432 | 0.079 | 1 | 2 | x | x |
| Desired value | — | — | — | 2 or less | 2 or less | o | o |

Ex: Example
CEx: Comparative Example consisting of a first base coating film, second base coating film and clear coating film, wherein the multiple layered coating film comprising the first base coating film having a dry coating film thickness of 25 μm, the second base coating film having a dry coating film thickness of 10 μm and the clear coating film having a dry coating film thickness of 30 μm has an elongation at 20° C. of 40 to 60%, a tensile strength at 20° C. of 400 to 600 kgf/m$^2$ and a ratio of viscous term to elastic term (tan δ) at −20° C. of 0.04 to 0.06, wherein the first water-based base coating material comprises a water-dispersible polyurethane composition (A) comprising a polyisocyanate component (a1), polyol component (a2), amine component (a3), neutralizing component for a carboxyl group (a4) and water (a5), a water-dispersible acrylic resin (B); and a curing agent (C), wherein the polyol component (a2) comprises a polycarbonate diol (a2-1) and a carboxyl group-containing diol (a2-2), and wherein the polycarbonate diol (a2-1) has a weight average molecular weight of 1,500 to 5,000.

2. The process for forming a multiple layered coating film according to claim 1, wherein the water-dispersible polyurethane composition comprises the polycarbonate diol (a2-1) and carboxyl group-containing diol (a2-2) in a molar ratio (a2-1:a2-2) of 1:0.8 to 1:2.

3. The process for forming a multiple layered coating film according to claim 1, wherein a solid content of the water-dispersible polyurethane composition (A) is 20 to 40% by mass, based on a resin solid content of the first water-based base coating material, a solid content of the water-dispersible acrylic resin (B) is within a range of 5 to 10% by mass, based on the resin solid content of the first water-based base coating material, and a solid content of the curing agent (C) is within a range of 5 to 50% by mass, based on the resin solid content of the first water-based base coating material.

* * * * *